United States Patent [19]
Marks et al.

[11] Patent Number: 5,218,078
[45] Date of Patent: Jun. 8, 1993

[54] PROCESS FOR PREPARING HALOGENATED POLYCARBONATE FROM EMULSIFIED REACTION MIXTURE

[75] Inventors: Maurice J. Marks, Lake Jackson; John K. Sekinger, Beaumont, both of Tex.

[73] Assignee: The Dow Chemical Company, Midland, Mich.

[21] Appl. No.: 730,323

[22] Filed: Jul. 15, 1991

[51] Int. Cl.$^5$ .............................. C08G 64/20
[52] U.S. Cl. ................................. 528/202; 528/171; 528/174; 528/196; 528/198; 528/204
[58] Field of Search ............... 528/202, 199, 198, 196, 528/204, 171, 174

[56] References Cited

U.S. PATENT DOCUMENTS

| | | | |
|---|---|---|---|
| 3,912,687 | 10/1975 | Haupt et al. | 528/196 |
| 4,224,434 | 9/1980 | Quinn et al. | 528/199 |
| 4,286,085 | 8/1981 | Jaquiss et al. | 528/196 |
| 4,388,455 | 6/1983 | Bales | 528/202 |
| 4,737,573 | 4/1988 | Silva et al. | 528/199 |
| 4,794,156 | 12/1988 | Ho et al. | 528/199 |
| 4,939,230 | 7/1990 | Munjal et al. | 528/199 |

FOREIGN PATENT DOCUMENTS

0366002 5/1990 European Pat. Off. .

*Primary Examiner*—Harold D. Anderson
*Attorney, Agent, or Firm*—John A. Langworthy

[57] ABSTRACT

A process for preparing a halogenated polycarbonate wherein phenolic-terminated, halogenated carbonate oligomers are prepared in the presence of a coupling catalyst, and are then condensed by contact with a carbonate precursor.

16 Claims, No Drawings

PROCESS FOR PREPARING HALOGENATED POLYCARBONATE FROM EMULSIFIED REACTION MIXTURE

FIELD OF THE INVENTION

This invention relates to a process for preparing halogenated polycarbonate, and in particular to such a process in which an activated pyridine catalyst is employed.

BACKGROUND OF THE INVENTION

Polycarbonate has found many uses as a class of materials because it combines, in general, a high level of heat and impact resistance, good dimensional stability, and good insulating and non-corrosive properties. For example, halogenated polycarbonate (and copolycarbonate) are known especially for resistance to physical deformation at high temperature and resistance to flammability.

In the performance of various known interfacial processes for preparing halogenated polycarbonate, it is found that the reaction mixture is thoroughly emulsified by the time formation of the polycarbonate product is complete, and several hours are required for the organic phase to separate from the emulsified mixture. It is difficult to readily wash an emulsified product-containing solution thoroughly enough to remove foreign material such as catalysts or inorganic salts, and the performance in a service environment of a product containing such foreign material is frequently impaired.

It is also found that certain of these known processes for preparing halogenated polycarbonate yield a product which is shown by analysis to contain significant amounts of Phenolic End Groups (a Phenolic End Group being an -OH moiety at a polycarbonate chain end); and/or Process Chemical End Groups (a Process Chemical End Group being the residue yielded at a polycarbonate chain end by reaction with the polycarbonate chain of a process chemical, such as a catalyst or other chemical which promotes, directs, regulates or otherwise influences the progress of the polycarbonate forming reaction). Analysis also reveals that halogenated polycarbonate containing significant amounts of Phenolic and/or Process Chemical End Groups is characterized by a tendency toward thermal degradation, as evidenced by the formation of color bodies upon heating.

It would consequently be desirable to provide a process for preparing halogenated polycarbonate which is improved over known processes such as are described above.

SUMMARY OF THE INVENTION

In one aspect, this invention involves a process for preparing a halogenated polycarbonate comprising (a) forming halogenated carbonate oligomers from a halogenated dihydroxy compound and a carbonate precursor; (b) condensing said oligomers into halogenated polycarbonate by contacting said carbonate oligomers with about 80 percent to about 120 percent of the moles of carbonate precursor used in step (a); and (c) recovering said halogenated polycarbonate.

In another aspect, this invention involves a process for preparing a halogenated polycarbonate comprising (a) admixing a halogenated dihydroxy compound with a coupling catalyst, a base and an organic solvent in an aqueous reaction mixture, (b) contacting said halogenated dihydroxy compound with a carbonate precursor in said reaction mixture, (c) admixing additional base with said reaction mixture until it remains emulsified when not agitated, (d) forming a halogenated polycarbonate by charging to said reaction mixture about 80 percent to about 120 percent of the amount of carbonate precursor with which said dihydroxy compound was contacted in step (b), and (e) recovering said halogenated polycarbonate.

The advantages of the process of this invention, among others, are that the organic and aqueous phases of the reaction mixture may be rapidly separated upon completion of the polycarbonate-formation reaction; and that the product of the invented process is a halogenated polycarbonate having both a Phenolic and a Process Chemical End Group content at desirably low levels, and also therefore having an improved resistance to degradation, such as thermal degradation.

By the process of this invention, a halogenated polycarbonate is prepared which is useful by itself or in compositions, for example, for the production of membranes, films, fibers, extruded sheets, multi-layer laminates and molded or shaped articles of virtually every variety, particularly for use in high temperature environments such as the automotive or electronics industries. For example, a halogenated polycarbonate is frequently molded in the range of 280°–320° C., and the halogenated polycarbonate prepared by the process of this invention shows superior stability at those temperatures. When softened by the application of heat, the halogenated polycarbonate of this invention can undergo fabrication and can therein be formed or molded using conventional techniques such as calendering, vacuum- or thermo-forming, or compression, injection, extrusion or blow molding, alone or in combination. The polycarbonate produced by the process of this invention can also be formed, spun or drawn into films, fibers, multi-layer laminates or extruded sheets, or can be compounded with one or more other organic or inorganic substances, on any machine suitable for such purpose.

DETAILED DESCRIPTION OF THE INVENTION

Halogenated polycarbonate can be prepared from an aromatic dihydroxy compound such as a halogenated diphenol, and a carbonate precursor such as a carbonic acid derivative, a haloformate or a carbonate ester. These components are often reacted by means of the phase boundary process in which the dihydroxy compound is partially dissolved and deprotonated in an aqueous alkaline solution, and the carbonate precursor is dissolved in an organic solvent. The aqueous alkaline solution can be formed from a base which may be selected from those including the alkali metal and alkaline earth metal phosphates, bicarbonates, oxides and hydroxides. A preferred base for preparing the aqueous alkaline solution is a caustic soda such as NaOH.

These components are frequently reacted by means of a mixture which is prepared initially from the halogenated dihydroxy compound, water, and an organic solvent selected from among those which are immiscible with water and non-reactive but in which the carbonate precursor and polycarbonate product are soluble. Representative solvents include chlorinated hydrocarbons such as methylene chloride, 1,2-dichloroethane, tetrachloroethane, chlorobenzene, and chloro-form, to which tetrahydrofuran, dioxane, nitrobenzene, dimethyl sulfoxide, xylene, cresol or anisole may be added, if desired. Also present in this reaction mixture is a coupling catalyst, of which the following are representative: a tertiary amine such as triethyl amine or an activated pyridine; a hindered secondary amine such as diisopropyl amine; a cyclic aza compound such as 2,2,6,6-tetramethyl piperidine or 1,2-dimethylimidazole; an amidine or aminoamidine compound such as 1-methyl-2-phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butylcyclohexyliminoacetate; or a phosphonium, sulfonium, arsonium or quaternary ammonium compound.

Activated pyridines which are particularly useful as coupling catalysts in the preparation of a halogenated polycarbonate by the process of this invention include either a pyridine or pyridine salt whose catalytic activity is increased by virtue of having a substituent at the 2 or 4 ring position. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. Activated pyridines having additional alkyl groups, such as those represented by the formulae:

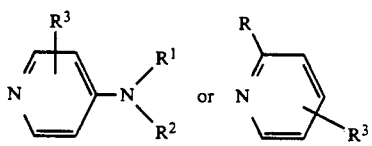

may also be used, where R is a monovalent alkyl radical, a cycloalkyl radical, or a polymer chain such that the formula weight of the catalyst is less than 50,000; $R^1$ and $R^2$ are each independently a monovalent alkyl radical or a polymer chain, such that the formula weight of the catalyst is less than 50,000, or $R^1$ and $R^2$ are $C_1$–$C_8$ alkyl radicals which are joined and, together with N, form a cyclic structure; and $R^3$ is independently hydrogen or a monovalent $C_1$–$C_8$ alkyl radical. A preferred activated pyridine is 4-dimethylaminopyridine.

Base is then added to the reaction mixture to impart increased reactivity to the halogenated dihydroxy compound by adjusting the pH of the aqueous phase to a level at which the dihydroxy compound is partially converted to anionic form. The pH of the aqueous phase is, as a result, adjusted to a level greater than 7 but, preferably, less than the pH of an aqeous equilibrium solution of the dimetal salt of the halogenated dihydroxy compound. A reducing agent such as sodium sulfite or sodium dithionite can also be advantageously added to the reaction mixture.

A carbonate precursor is contacted with an agitated mixture of the aqueous alkaline solution of the halogenated dihydroxy compound, and, for such purpose, the carbonate presursor can be bubbled into the reaction mixture in the form of a gas, or can be dissolved and introduced in solution form. The mixture is agitated in a manner which is sufficient to disperse or suspend droplets of the solvent containing the carbonate precursor in the aqueous alkaline solution. Reaction at the interface of the organic and aqueous phases created by such agitation yields oligomeric carbonate intermediates with phenolic end groups, and these intermediates can then be condensed into a final, high molecular weight, halogenated polycarbonate product.

The molecular weight of a halogenated polycarbonate can be controlled by addition to the reaction mixture of a chain terminator which may be selected from monofunctional substances such as phenols, alcohols, amines, imides, carbonic acid chlorides, sulfonic acid chlorides, or phenylchlorocarbonates. Addition of a chain terminator may be made to the reaction mixture before or after a dihydroxy compound is contacted with a carbonate precursor.

Upon completion of polymerization, the organic and aqueous phases are separated to allow purification of the reaction mixture and recovery of the polycarbonate product from the organic phase. The organic phase is washed as needed in a centrifuge with dilute base, water and/or dilute acid until free of unreacted monomer, residual process chemicals and/or other electrolytes. Recovery of the polycarbonate product from the organic phase can be effected by spray drying, steam devolatilization, direct devolatilization in a vented extruder, or precipitation by use of an anti-solvent such as toluene, cyclohexane, heptane, methanol, hexanol, or methyl ethyl ketone.

The reaction can be run at a temperature between 0° C.–100° C., although usually not in excess of the boiling point of the solvent used. Frequently, the reaction is run at a temperature of 0° C.–45° C.

The process of the present invention may be conducted in a single reaction vessel, or may be conducted independently in a series of individual reaction vessels wherein at least a portion of the reaction mixture prepared in a first reaction vessel in a first step is transferred to a second reaction vessel wherein another step is conducted, and so on throughout the process. The contemplated individual reaction vessels may additionally be continuous or batch reactors. Finally, the process may be conducted in a continuous reaction system, such as a tubular reactor, wherein the reaction system contains multiple reaction zones.

Examples of some halogenated diphenols suitable for the preparation of halogenated aromatic polycarbonate include variously bridged, substituted or unsubstituted aromatic diols (or mixtures thereof) represented generally by the formula:

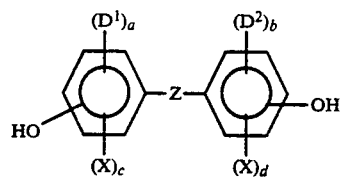

wherein:
(I) Z is (A) a divalent radical, of which all or different portions can be (i) linear, branched, cyclic or bicyclic, (ii) aliphatic or aromatic, and/or (iii) unsaturated, said divalent radical being composed of 1–35 carbon atoms together with up to five oxygen, nitrogen, sulfur, phosphorous and/or halogen (such as fluroine, chlorine and/or bromine) atoms; or (B) S, $S_2$, SO, $SO_2$, O or CO; or (C) a single bond;
(II) each X is independently hydrogen, a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy;

(III) $D^1$ and $D^2$ are the same or different halo radicals, such as fluoro, chloro, bromo or iodo; and (IV) $0 \geq a \leq 4$ and $0 \geq b \leq 4$, although a and b cannot both equal zero; and c=4-a and d=4-b.

For example, the bridging radical represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$.

Halogenated diphenols having a single or joined aryl rings may be employed herein in addition to the dihydroxy compounds described above. Such compounds include, for example, mono- or dihaloresorcinol, or mono- or dihalo,dihydroxy- naphthalene or anthracene, and the like.

Particular halogenated dihydroxy compounds useful in the process of this invention include, but are not limited to:

2,2-bis(4-hydroxy-3-bromophenyl)-propane,
2,2-bis(4-hydroxy-3-chlorophenyl)-propane,
bis(4-hydroxy-3-bromophenyl)-methane,
bis(4-hydroxy-3-chlorophenyl)-methane,
bis(4-hydroxy-3-bromophenyl)-sulphone,
bis(4-hydroxy-3-chlorophenyl)-sulphone,
bis(4-hydroxy-3-bromophenyl)-sulphide,
bis(4-hydroxy-3-chlorophenyl)-sulphide,
1,1-bis(4-hydroxy-3-bromophenyl)cyclohexane,
1,1-bis(4-hydroxy-3-chlorophenyl)cyclohexane,
2,2-bis(4-hydroxy-3,5-dibromophenyl)-propane ("Tetrabromobisphenol-A"),
2,2-bis(4-hydroxy-3,5-dichlorophenyl)-propane ("Tetrachlorobisphenol-A"),
bis(4-hydroxy-3,5-dibromophenyl)-methane,
bis(4-hydroxy-3,5-dibromophenyl)-sulphone,
bis(4-hydroxy-3,5-dibromophenyl)-sulphide,
1,1-bis(4-hydroxy-3,5-dichlorophenyl) cyclohexane,
and the like.

Halogenated dihydroxy compounds also include, in addition to tetrahalogenated diphenols, statistical mixtures of non-, mono-, di-, tri- and tetrahalogenated diphenols. These statistical mixtures may be prepared, for example, by the halogenation of bisphenols as described in U.S. Pat. No. 4,075,119, which is incorporated herein in its entirety. A preferred tetrahalogenated diphenol is Tetrabromobisphenol-A, 2,2-bis(3,5-dibromo-4-hydroxyphenyl)propane ("TBBA"). A preferred dibrominated diphenol is Dibromobisphenol-A [2,2-bis(4-hydroxy-3-bromophenyl)-propane].

The preferred process of this invention is that in which an aromatic halogenated polycarbonate is prepared. An aromatic halogenated polycarbonate is defined herein with reference to the oxygen atoms, of the one or more dihydroxy compounds present in the polycarbonate chain, which are bonded to a carbonyl carbon. In an aromatic halogenated polycarbonate, all such oxygen atoms are bridged by a dihydroxy compound residue some portion of which is an aromatic ring.

Instead of a halogenated polycarbonate, a halogenated copolycarbonate can be prepared by incorporating into the reaction mixture one or more dihydroxy compounds which are different from the halogenated dihydroxy compound. These "different" dihydroxy compounds may include, for example, one or more which are simply halogenated in a different manner or one or more which are not halogenated at all. The different dihydroxy compounds can be charged to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate. When a dicarboxylic acid (or derivative) or a hydroxycarboxylic acid is used in the reaction mixture, or to form an oligomeric prepolymer, instead of one of the different dihydroxy compounds, a halogenated poly(ester/carbonate) is obtained instead of a halogenated polycarbonate.

Non-halogenated dihydroxy compounds useful in preparing such a halogenated copolycarbonate are any of the halogenated dihydroxy compounds described above which do not contain any halogen atoms on an aromatic ring which contains a hydroxyl group. Suitable non-halogenated diphenols include, but are not limited to:

bis(4-hydroxyphenyl)-sulphone,
bis(3-hydroxyphenyl)-sulphone,
bis(2-hydroxyphenyl)-sulphone,
bis(4-hydroxyphenyl)methane,
1,1-bis(4-hydroxyphenyl)-propane,
1,1-bis(4-hydroxyphenyl)-butane,
1,1-bis(4-hydroxyphenyl)-heptane,
1,1-bis(4-hydroxyphenyl)-cyclopentane,
1,1-bis(4-hydroxyphenyl)-cyclohexane;

and the like. A preferred non-halogenated aromatic dihydroxy compound is 2,2-bis(4-hydroxyphenyl) propane ("Bisphenol-A").

Halogenated copolycarbonates can also be prepared by reaction of a halogenated diphenol, and optionally one or more other dihydroxy compounds, with a carbonate precursor and, for example, the following: a hydroxy-terminated poly(phenylene oxide) or poly(methyl methacrylate), a phosphonyl dichloride, or an aromatic ester of a phosphonic acid, or by reaction in the presence of a chlorine- or amino-terminated polysiloxane. Siloxane/carbonate block copolymers are discussed in greater detail in Paul, U.S. Pat. No. 4,596,970 and poly(ester/carbonate)s are discussed in greater detail in Swart, U.S. Pat. No. 4,105,533, each being incorporated herein in its entirety.

A branched rather than linear halogenated polycarbonate molecule can be obtained by adding to the reaction mixture a tri- or polyfunctional monomer such as a tri- or tetrafunctional phenol or carboxylic acid (or derivative, such as an acyl halide or anhydride), a bisphenol containing carboxylic acid side groups, or a nitrogen-containing compound such as cyanuric chloride, or compounds containing a mixture of such groups. Preferred branching agents are trimellitic acid or pyromellitic dianhydride.

Polycarbonate blends can be prepared by mixing a halogenated polycarbonate with one or more different polycarbonates, and/or one or more different copolycarbonates, and/or one or more other kinds of polymers or copolymers, such as polyethylene, polyester, polyacetal, polyamide, polysulfone, poly(phenylene oxide), acrylonitrile/butadiene/styrene copolymer and/or styrene/maleic anhydride copolymer.

Steps of particular importance in making a halogenated polycarbonate by the process of this invention involve preparation of a slurry by admixing at least one halogenated dihydroxy compound, a non-reactive, immiscible organic solvent, a coupling catalyst and water. While the mixture is cooled, addition is made of an amount of base sufficient to impart to the mixture a pH of about 3 pH units, and preferably about 2 pH units, less than the pH of an aqueous equilibrium solution of the dimetal salt of the halogenated dihydroxy compound.

In the Oligomerization Phase, a carbonate precursor such as phosgene is then contacted with the reaction mixture, with rapid stirring, while the pH of the aqueous phase is maintained at the previously established level by the addition of further base. The amount of carbonate precursor which is added to the reaction mixture in this phase is preferably about 0.55 to about 0.75 mole, and is more preferably about 0.6 to about 0.7 mole, per mole of all dihydroxy compounds present in the reaction mixture. Formation of phenolic-end-group-terminated carbonate oligomers ensues, and substantial conversion of these reactants to phenolic-end-group-terminated carbonate oligomers of the dihydroxy compounds is indicated by substantial absence of any dihydroxy compound from the aqueous phase of the reaction mixture. Addition of an amount of base is then made which is sufficient to cause the mixture, when it is not agitated, to remain emulsified rather than rapidly separate into aqueous and organic phases. Rapid separation on the laboratory scale typically occurs in five minutes or less.

In the Polymerization Phase, additional carbonate precursor is then contacted with the mixture with continued agitation. The amount of carbonate precursor which is added to the reaction mixture in this phase is about 80 percent to about 130 percent, and preferably about 90 percent to about 120 percent, of the amount of carbonate precursor previously added during the Oligomerization Phase, as described above. Substantial conversion of the phenolic-terminated carbonate oligomers described above to high molecular weight halogenated polycarbonate is indicated when the halogenated polycarbonate product has reached a selected weight average molecular weight target. The final product is recovered by convential methods, as described above, which may involve the addition of further small amounts of carbonate precursor to react with any residual base.

Using the process of this invention, a representative embodiment of which is generally described above, a halogenated polycarbonate product can be obtained having a weight average molecular weight, as determined by gel permeation chromatography using a Bisphenol-A polycarbonate standard, of about 10,000 to about 400,000. It is also found that such a halogenated polycarbonate product has a high degree of polycondensation, which can be characterized by (a) a Phenolic End Group content of less than about 275 ppm, and (b) a content of less than about 90 ppm of the element(s) of a Process Chemical End Group(s) which is(are) bonded to a copolycarbonate chain end(s).

Process chemicals are typically added to a reaction mixture to promote, direct, regulate or otherwise influence the progress of the reaction by which a halogenated polycarbonate is formed from its precursor chemicals. Representative examples of process chemicals include catalysts, solvents, bases, surfactants and water. In general, the precursor chemicals include only dihydroxy compound(s), carbonate precursor(s), and other substances (such as a chain terminator or branching agent) which are copolymerizable therewith to form a halogenated polycarbonate chain. When performing the function of catalyzing or otherwise influencing the progress of the polycarbonate-forming reaction, process chemicals do not react with the polycarbonate-forming precursors so as to become part of the polycarbonate molecule.

If, however, process chemicals malfunction and react with a chloroformate or phenolic-functional reactive site, they can become bonded to the polycarbonate chain and form a Process Chemical End Group. The amount of a Process Chemical End Group in a halogenated polycarbonate can therefore be expressed as the amount of the element of the Process Chemical End Group which is bonded to the polycarbonate chain. This amount may be expressed, for example, in parts by weight per million parts of halogenated polycarbonate. A halogenated polycarbonate may have more than one kind of Process Chemical End Group depending on the extent to which different process chemicals in the reaction mixture react with a polycarbonate molecule to become bonded to the polymer chain. The process of this invention yields a halogenated polycarbonate which contains a desirably low level of Process Chemical End Groups.

One common example of a Process Chemical End Group can result from the use of a trialkyl amine ("TAA") as a coupling catalyst. TAA is often used to facilitate both the coupling of dihydroxy compounds with phosgene and chloroformates, as well as the coupling of bis- and monoesters of a carbonate precursor into higher molecular weight copolycarbonate. TAA forms an intermediate complex with the unesterified portion of a carbonate precursor at a chain end to enhance its reactivity. Rather than just forming such a complex and then splitting off, however, TAA is sometimes found instead, particularly in the formation of halogenated polycarbonates as opposed to non-halogenated polycarbonates, to displace the leaving group from the carbonyl carbon at the chain end and bond to the carbonyl carbon, forming a carbamate group.

The amount of a Process Chemical End Group in a halogenated polycarbonate can be analyzed by any of several methods, depending on the element or compound to be analyzed. The amount of a Process Chemical End Group which is bonded to the polymer chain through an element not found in the polycarbonate-forming precursor chemicals can be analyzed by methods such as combustion, titrimetric or photometric techniques. For example, carbamate end groups produced by the reaction of a trialkyl amine catalyst with chloroformates can be quantified by ozonolysis in a nitrogen analyzer. Process Chemical End Groups which are bonded through element(s) also found in the precursor chemicals, such as carbon, can be analyzed by several other methods such as various types of spectroscopy or chromatography, depending on the chemical nature of the Process Chemical End Group radical. In both cases—when the bonded element of a Process Chemical End Group is found in the precursor chemicals and when it is not—the amount of a Process Chemical End Group can be expressed in terms of the amount of the bonded element.

A Phenolic End Group results when a hydroxy moiety on a diphenol residue on the end of a polycarbonate chain does not react with a carbonate precursor or a polycarbonate-forming intermediate to continue chain growth. Phenolic End Groups can be quantitatively analyzed by various techniques. The amount of Phenolic End Groups on a halogenated dihydroxy residue can be selectively determined in the presence of Phenolic End Groups on a non-halogenated dihydroxy residue by spectrophotometric analysis since halogen substituents bonded to phenolic compounds cause a shift in absorbtivity to higher wavelengths compared to non-halogenated phenolic compounds. The amount of Phenolic End Groups on a non-halogenated dihydroxy residue can in turn be selectively determined in the presence of Phenolic End Groups on a halogenated dihydroxy residue by the titanium chloride colorimetric method described in Horbach et al, Encyl. Ind. Chem. Anal., Vol. 17, pp. 329–352, Krieger, 1973. The amount of Phenolic End Groups can be expressed in parts by weight per million parts of halogenated polycarbonate. The process of this invention yields a halogenated polycarbonate which contains a desirably low level of Phenolic Chemical End Groups.

A variety of problems can result from the presence in a halogenated polycarbonate of Phenolic and/or Process Chemical End Groups at levels exceeding the amounts stated above, the most serious of which is that the end groups promote degradation of a halogenated polycarbonate in a service environment. A good example of the service stress placed on a halogenated polycarbonate is thermal aging because a halogenated polycarbonate is frequently processed and used in a high temperature environment. It is found that a halogenated polycarbonate which contains a significant amount of Phenolic and/or Process Chemical End Groups suffers from heat instability and will form color bodies when subjected to thermal aging.

Other problems which can be associated with the presence of Phenolic and/or Process Chemical End Groups in a halogenated polycarbonate involve washability of the polycarbonate-forming solution. It is found that Phenolic and/or Process Chemical End Groups are surface active and contribute substantially to the formation of an emulsion in the final, high molecular weight, polycarbonate-containing reaction mixture. Although the reaction mixture is purposely emulsified during the Oligomerization Phase of this invention, a final product, polycarbonate-containing solution which is emulsified is difficult to readily wash for the purpose of removing from the product foreign material such as inorganic salts, for example $Na_2CO_3$ or NaCl, or catalysts. A halogenated polycarbonate which contains such foreign materials may display performance deficiencies when subjected to a service environment.

While foreign materials such as inorganic salts or catalysts may be seen as contaminants which should desirably be washed out of a reaction mixture, Phenolic End Groups and Process Chemical End Groups may be seen as impurities which are bonded to the polymer chain itself and are not subject to being washed out of the reaction solution. The process of this invention for preparing halogenated polycarbonate is therefore improved over those previously known in the art because the halogenated polycarbonate prepared by this process is substantially purified of, or is substantially free of, Phenolic End Groups and Process Chemical End Groups, the latter as indicated by reduced amounts of the element of the Process Chemical End Group which is bonded to the polycarbonate chain. This improved end group selectivity yields one of the important advantages of this invention: a process for preparing a halogenated polycarbonate which has greater resistance to degradation because it is substantially free of the degradation-inducing effect of Phenolic and Process Chemical End Groups, such as the thermal degradation mentioned above.

The process of this invention for the preparation of halogenated polycarbonate can further involve compounding with the halogenated polycarbonate product conventional thermoplastic polymer additives which include, but are not limited to, fillers, thermal stabilizers, dyes, flame retarding agents, reinforcing agents, softeners, mold-release agents, seed-forming agents, pigments, plasticizers, antistatic agents, UV absorbers, lubricants, compatibilizers, and the like, in conventional amounts generally not exceeding 25 percent, and preferably not exceeding 5 percent, by weight of the total composition.

Illustrative Embodiments. To illustrate the practice of this invention, examples of several preferred embodiments are set forth below. It is not intended, however, that these examples (Examples 1 and 2) should in any manner restrict the scope of this invention. Some of the particularly desirable features of this invention may be seen by contrasting the characteristics of Examples 1 and 2 with those of various controlled processes (Controls A-D) which do not possess the features of, and are not therefore embodiments of, this invention.

Controls A and C are each a process which is substantially representative of a process described in Haupt, U.S. Pat. No. 3,912,687. Controls B and D are each a process which is substantially representative of a process described in Jaquiss, U.S. Pat. No. 4,286,085. Comparison to Examples 1 and 2 of these controls, and the halogenated polycarbonate compositions produced thereby, illustrates the improvement obtained in a halogenated polycarbonate from the process of this invention as to matters such as Phenolic and/or Process Chemical End Group content.

The processes of Controls A-D and Examples 1 and 2 are each performed in a 1 L reactor fitted with a mechanical stirrer, a stirrer baffle, a thermometer, a pH electrode connected to a Fisher Model 650 pH meter/controller, a liquid inlet adapter, a phosgene inlet/dip tube, and a gas outlet tube connected to a phosgene scrubber which contains 10 percent aqueous NaOH and 2 percent triethylamine. Fifty percent aqueous NaOH is added from a graduated addition funnel by a Masterflex pump connected to the pH controller through a relay switch. Phosgene is added from a 5 pound cylinder through a gas flowmeter. The mass of phosgene added is determined from the cylinder weight loss using a Flexweigh Corp. balance. The contents of the reactor are agitated at 800–1,000 rpm during the synthesis. The reactor is immersed in an ice bath to maintain its temperature below 30° C.

The specific procedures involved in Controls A-D and Examples 1 and 2 are as follows:

Control A. To a reactor fitted as described above is added 60.3 grams (0.1109 mole) Tetrabromobisphenol-A ("TBBA"), 0.08 grams 90 percent phenol (0.074 grams, 0.00079 mole, 0.7 mole percent phenol), 1.6 ml (1.12 grams, 0.011 mole, 10 mole percent) triethylamine ("TEA"), 400 ml water, and 470 ml dichloromethane. The aqueous phase pH is adjusted to 7 with aqueous NaOH. Then 16 grams (0.16 mole, 1.4 mole/mole TBBA monomer) phosgene is introduced while maintaining the pH at about 7 with additional aqueous NaOH. The pH is increased to 13–14 with aqueous NaOH, and the mixture is stirred 1.5 hours to complete the polymerization. The resulting organic/aqueous emulsion is allowed to stand 18 hours to separate. The aqueous phase is removed and the polymer solution is washed with 1 N HCL and repeatedly with water to remove the catalyst and salts. Evaporation of solvent from the polymer solution yields a brittle film.

Control B. To a reactor fitted as described above is added 57 grams (0.1048 mole) TBBA, 0.08 grams 90 percent phenol (0.07 grams, 0.0007 mole, 0.7 mole percent phenol), 0.26 grams (0.0021 mole, 2 mole percent) 4-N,N-dimethylamino pyridine ("DMAP"), 57 ml water, and 246 ml dichloromethane. The aqueous phase pH is adjusted and held at 9 with 50 percent NaOH, and 8 grams (0.08 mole, 0.77 mole/mole TBBA monomer) phosgene is added. Then 320 ml dichloromethane is added, the pH is increased and held at 11 with aqueous NaOH, and 3 grams (0.03 mole, 0.30 mole/mole TBBA monomer) phosgene is introduced. The amount of phosgene added in this second phosgenation step is 37.5 percent of the amount added in the first phosgenation step. The resulting organic/aqueous emulsion is allowed to stand 18 hours to separate. The aqueous phase is removed and the polymer solution is washed as described above. Evaporation of solvent from the polymer solution yields a brittle film.

Example 1. To a reactor fitted as described above is added 60.3 grams (0.1109 mole) TBBA, 0.12 grams (0.00079 mole, 0.7 mole percent) p-tertiarybutylphenol ("PTBP"), 0.27 grams (0.0022 mole, 2 mole percent) DMAP, 400 ml water, and 470 ml dichloromethane. The aqueous phase pH is adjusted to pH 8 with addition of 50 percent aqueous NaOH. Then 7 grams (0.071 mole, 0.64 mole/mole TBBA monomer) phosgene is introduced at about 0.4 grams/minute while maintaining a pH of about 8 with additional 50 percent aqueous NaOH. Afterward, the pH is increased and held at about 11 with addition of 50 percent aqueous NaOH. Then 8 more grams (0.081 mole, 0.73 mole/mole TBBA monomer) phosgene is added to complete the polymerization. The amount of phosgene added in this second phosgenation step is 114 percent of the amount added in the first phosgenation step. After completion of polymerization, the pH is reduced to about 8.5 with addition of 2 grams phosgene, the organic and aqueous phases rapidly separated, and the aqueous phase is removed. The polymer solution is washed as described above. Evaporation of solvent from the polymer solution yields a tough, flexible film.

Control C. To a reactor fitted as described above is added 14.8 grams (0.065 mole) Bisphenol-A ("Bis-A"), 35.2 grams (0.065 mole) TBBA, 0.27 grams (0.0018 mole, 1.4 mole percent) PTBP, 0.98 grams (0.01 mole, 7.5 mole percent) triethylamine, 357 ml water, and 438 ml dichloromethane. The aqueous phase pH is adjusted to 8 with aqueous NaOH. Then 30 grams (0.30 mole, 2.34 mole/mole of Bis-A/TBBA monomer) is introduced while maintaining the pH at about 8 with additional aqueous NaOH. The pH is increased to 13–14 with aqueous NaOH, and the mixture is stirred 1 hour to complete the polymerization. The resulting organic/aqueous emulsion is allowed to stand 18 hours to separate. The aqueous phase is removed and the polymer solution is washed as described above.

Control D. To a reactor fitted as described above is added 16.9 grams (0.074 mole) Bis-A, 40.1 grams (0.074 mole) TBBA, 0.31 grams 90 percent phenol (0.28 grams, 0.003 mole, 2.0 mole percent phenol), 0.36 grams (0.003 mole, 2 mole percent) DMAP, 57 ml water, and 246 ml dichloromethane. The aqueous phase pH is adjusted and held at 9 with 50 percent NaOH, and 12 grams (0.12 mole, 0.82 mole/mole of Bis-A/TBBA monomer) phosgene is added. Then 320 ml dichloromethane is added, the pH is increased and held at 11 with aqueous NaOH, and 4 grams (0.04 mole, 0.27 mole/mole of Bis-A/TBBA monomer) phosgene is introduced. The amount of phosgene added in this second phosgenation step is 33 percent of the amount added in the first phosgenation step. The resulting organic/aqueous emulsion is allowed to stand 18 hours to separate. The aqueous phase is removed and the polymer solution is washed as described above.

Example 2. To a reactor fitted as described above is added 14.8 grams (0.065 mole) Bis-A, 35.2 grams (0.065 mole) TBBA, 0.27 grams (0.0018 mole, 1.4 mole percent) PTBP, 0.32 grams (0.0026 mole, 2 mole percent) DMAP, 357 ml water, and 438 ml dichloromethane. The aqueous phase pH is adjusted to pH 8 with addition of 50 percent aqueous NaOH. Then 9 grams (0.091 mole, 0.70 mole/mole of Bis-A/TBBA monomer) phosgene is introduced at about 0.4 grams/minute while maintaining a pH of about 8 with additional 50 percent aqueous NaOH. Afterward the pH is increased and held at about 12.5 with the addition of 50 percent aqueous NaOH. Then 10 grams (0.110 mole, 0.78 mole/mole of Bis-A/TBBA monomer) more phosgene is added to complete the polymerization. The amount of phosgene added in this second phosgenation step is 111 percent of the amount added in the first phosgenation step. After completion of polymerization, the pH is reduced to about 8.5 with the addition of 2 grams phosgene, the organic and aqueous phases rapidly separated, and the aqueous phase is removed. The polymer solution is washed as described above. Evaporation of solvent from the polymer solution yields a tough, flexible film.

Analytical measurements were made to contrast the halogenated polycarbonates resulting from the processes of Controls A-D with those resulting from Examples 1 and 2, and are summarized in Table I. Molecular weight determinations are performed by gel permeation chromatography ("GPC") using a Bisphenol-A polycarbonate standard. Bisphenol-A Phenolic End Groups ("BA-OH") are measured by the titanium chloride colorimetric method described in Horbach et al, Encyl. Ind. Chem. Anal., Vol. 17, pp. 329–352, Krieger, 1973.

Tetrabromobisphenol-A Phenolic End Groups ("TBBA-OH") are measured using GPC from the total polymer absorbance at 295 nm, calibrated against TBBA.

Nitrogen analysis to detect the formation of Process Chemical End Groups by bonding of a TEA or DMAP residue to a copolycarbonate chain is performed using an Antek Model 720 nitrogen detector, which measures total non-volatile polymer nitrogen content.

In Table I, "Second Phosgenation, %" is the amount of phosgene added in the second phosgenation step as a percent of the amount added in the first phosgenation step; "MW$_w$" is weight-average molecular weight; "BA-OH ppm" is the content in parts per million ("ppm") of Phenolic End Groups located on the residue of a Bisphenol-A molecule in the BA/TBBA copolycarbonate; "TBBA-OH ppm" is the content of Phenolic End Groups located on the residue of a Tetrabromobisphenol-A molecule in ppm; "-OH Total ppm" is the total content of Phenolic End Groups in the specimen of polycarbonate in ppm; and "Nitrogen ppm" is the total content of the element of the Process Chemical End Groups bonded to the polycarbonate chain in the specimen of polycarbonate in ppm, determined in this instance as the nitrogen content derived from the bonding of a TEA or DMAP residue to a polycarbonate chain.

TABLE I

Results of Analysis of Halogenated Polycarbonates Prepared by Processes of Controls A-D and Examples 1 and 2

|  | Second Phosgenation, % | $MW_w$ | BA-OH, ppm | TBBA-OH, ppm | -OH Total, ppm | Nitrogen, ppm |
|---|---|---|---|---|---|---|
| Control A | — | 31,256 | — | 437 | 437 | 1,407 |
| Control B | 37.5 | 60,073 | — | 1,180 | 1,180 | 20 |
| Example 1 | 114 | 121,285 | — | 205 | 205 | 6 |
| Control C | — | 45,591 | 21 | 156 | 177 | 283 |
| Control D | 33 | 42,891 | 305 | 591 | 896 | 12 |
| Example 2 | 111 | 54,556 | 79 | 174 | 253 | 49 |

The results displayed in Table I demonstrate the benefits to be obtained from the preparation of halogenated polycarbonate by the process of this invention. Controls A-D, which substantially correspond to certain processes for preparing polycarbonate as disclosed by the prior art yield products which are less desirable than the products obtained from the process of this invention. For example, in Controls A and C, TBBA was polymerized to form polycarbonate. However, the product resulting from both of those processes has a substantially lower molecular weight, a substantially higher bound nitrogen (Process Chemical End Group) content and a higher Phenolic End Group content than the polycarbonate obtained from Example 1, being a process of this invention.

A comparison of Controls C and D and Example 2, in which both TBBA and Bis-A are copolymerized to form a copolycarbonate, shows similar results. The product of Example 2 has a higher molecular weight than that of either Control C or D, and neither of the products of Controls C and D has the balance of a desirably low content of both Phenolic and Process Chemical End Groups as displayed by the product of Example 2.

The balance of a desirably low content of both Phenolic and Process Chemical End Groups possessed by the halogenated polycarbonates produced by Examples 1 and 2 imparts to them improved resistance to degradation and improved washability. For example, it can be noted that in the performance of Examples 1 and 2, the organic and aqueous phases separated rapidly after polycarbonate formation was complete, but that the reaction solutions resulting from the performance of Controls A-D required between 1 and 18 hours to separate.

It is within the skill in the art to practice this invention in numerous modifications and variations in light of the above teachings It is, therefore, to be understood that changes may be made in the various described embodiments of this invention without departing from the spirit and scope of this invention as defined by the appended claims.

What is claimed is:

1. A process for preparing a halogenated polycarbonate comprising
    (a) admixing a halogenated dihydroxy compound with a polycarbonate formation coupling catalyst, a base and an organic solvent in an aqueous reaction mixture,
    (b) forming phenolic-end-group-terminated carbonate oligomers from a carbonate precursor and said halogenated dihydroxy compound in said reaction mixture,
    (c) admixing additional base with said reaction mixture to produce an emulsified reaction mixture,
    (d) forming a halogenated polycarbonate by charging to said emulsified reaction mixture about 80 percent to about 130 percent of the amount of carbonate precursor from which the phenolic-end-group-terminated carbonate oligomers are formed in step (b), and
    (e) recovering said halogenated polycarbonate.

2. The process of claim 1 wherein the base admixed in the aqueous reaction mixture in step (a) is an alkali metal or alkaline earth metal phosphate, bicarbonate, oxide or hydroxide.

3. The process of claim 2 wherein step (a) comprises adjusting the pH of the aqueous reaction mixture to a pH which is about 2 pH units less than the pH of an aqueous equilibrium solution of a dimetal salt of the halogenated dihydroxy compound.

4. The process of claim 1 wherein step (b) further comprises maintaining the pH of the reaction mixture formed in step (a) at the pH which said reaction mixture possesses at the completion of step (a) by the addition of further base during formation of the phenolic-end-group-terminated carbonate oligomers.

5. The process of claim 1 wherein the amount of carbonate precursor, from which in step (b) phenolic-end-group-terminated carbonate oligomers are formed, is about 0.55 mole to about 0.75 mole per mole of dihydroxy compound present in the reaction mixture.

6. The process of claim 1 wherein step (b) further comprises forming phenolic-end-group-terminated carbonate oligomers by contacting said halogenated dihydroxy compound with said carbonate precursor until there is substantial absence of said dihydroxy compound from the aqueous phase of said reaction mixture.

7. The process of claim 1 wherein step (d) is performed while the pH of the emulsified reaction mixture resulting from step (c) is maintained at the pH which said emulsified reaction mixture possesses at the completion of step (c).

8. The process of claim 1 wherein step (a) further comprises admixing a halogenated dihydroxy compound and a non-halogenated dihydroxy compound in said reaction mixture.

9. The process of claim 1 wherein the halogenated dihydroxy compound is Tetrabromobisphenol-A.

10. The process of claim 1 wherein the polycarbonate formation coupling catalyst admixed with the reaction mixture in step (a) is a 2- or 4-substituted pyridine.

11. The process of claim 1 wherein the halogenated polycarbonate recovered in step (e) has (A) a phenolic end group content of less than about 275 weight parts per million, and (B) a content of less than about 90 weight parts per million of process chemical end group elements bonded to halogenated polycarbonate chain ends.

12. The process of claim 11 wherein the halogenated polycarbonate recovered in step (e) has a process chemical end group bonded to a halogenated polycarbonate chain end through the element nitrogen.

13. The process of claim 2 wherein step (a) comprises adjusting the pH of the aqueous reaction mixture to a pH which is about 3 pH units less than the pH of an aqueous equilibrium solution of a dimetal salt of the halogenated dihydroxy compound.

14. The process of claim 1 wherein a halogenated polycarbonate is formed by charging to said emulsified reaction mixture in step (d) about 90 percent to about 120 percent of the amount of carbonate precursor from which the phenolic-end-group-terminated carbonate oligomers are formed in step (b).

15. The process of claim 1 wherein the amount of carbonate precursor, from which in step (b) phenolic-end-group-terminated carbonate oligomers are formed, is about 0.6 mole to about 0.7 mole per mole of dihydroxy compound present in the reaction mixture.

16. The process of claim 8 wherein the halogenated dihydroxy compound is Tetrabromobisphenol-A.

* * * * *